United States Patent
Sohn et al.

(10) Patent No.: US 8,787,341 B2
(45) Date of Patent: Jul. 22, 2014

(54) METHOD FOR REPORTING CHANNEL INFORMATION BASED ON LINK ADAPTATION IN WIRELESS LOCAL AREA NETWORK AND THE APPARATUS FOR THE SAME

(75) Inventors: Ill Soo Sohn, Anyang-si (KR); Yong Ho Seok, Anyang-si (KR); Kyoung Young Song, Anyang-si (KR); Dae Won Lee, Anyang-si (KR); Byeong Woo Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 13/500,352

(22) PCT Filed: Nov. 23, 2011

(86) PCT No.: PCT/KR2011/008993
§ 371 (c)(1),
(2), (4) Date: Apr. 5, 2012

(87) PCT Pub. No.: WO2012/070872
PCT Pub. Date: May 31, 2012

(65) Prior Publication Data
US 2012/0269183 A1  Oct. 25, 2012

Related U.S. Application Data

(60) Provisional application No. 61/417,284, filed on Nov. 26, 2010.

(51) Int. Cl.
*H04W 4/00* (2009.01)
*H04L 1/00* (2006.01)
*H04L 1/06* (2006.01)

(52) U.S. Cl.
CPC ............ *H04L 1/0025* (2013.01); *H04L 1/0026* (2013.01); *H04L 1/06* (2013.01); *H04L 1/0027* (2013.01)
USPC ............ 370/338; 370/310; 370/241; 370/252

(58) Field of Classification Search
USPC ......... 370/474, 436, 338, 341, 334, 330, 333, 370/329, 328, 260, 281, 252; 375/260
See application file for complete search history.

(56) References Cited

U.S. PATENT DOCUMENTS 7,804,800 B2 * 9/2010 Li et al. .................. 370/334
8,363,627 B2 * 1/2013 Trainin .................. 370/338

(Continued)

FOREIGN PATENT DOCUMENTS

| CN | 101044695 A | 9/2007 |
| CN | 101142761 A | 3/2008 |

(Continued)

OTHER PUBLICATIONS

M. Fischer, "Link Adaptation Subfield for VHT," IEEE 802.11-10/1095r0, Broadcom, Sep. 12, 2010, 5 pages.

(Continued)

*Primary Examiner* — Bob Phunkulh
*Assistant Examiner* — Walli Butt
(74) *Attorney, Agent, or Firm* — Birch, Stewart, Kolasch & Birch, LLP

(57) ABSTRACT

A method for reporting channel information in a wireless local area network system is provided. The method includes receiving a data block for requesting a modulation and coding scheme (MCS) feedback from a requesting station, the data block including a data field and a stream indicator indicating a number of at least one spatial stream in the data field; determining, the MCS feedback based on the data block; and, transmitting the MCS feedback to the requesting station, the MCS feedback including a recommended MCS and a recommended stream indicator indicating a number of at least one recommended spatial stream. The number of the at least one recommended spatial stream in the MCS feedback is equal or less than the number of the at least one spatial stream in the data block.

9 Claims, 18 Drawing Sheets

(56) References Cited

U.S. PATENT DOCUMENTS

| | | | |
|---|---|---|---|
| 2006/0285479 A1* | 12/2006 | Han et al. | 370/203 |
| 2008/0247370 A1 | 10/2008 | Gu et al. | |
| 2009/0175181 A1 | 7/2009 | Kim et al. | |
| 2010/0091675 A1 | 4/2010 | Sawai | |
| 2010/0248635 A1 | 9/2010 | Zhang et al. | |
| 2010/0260138 A1* | 10/2010 | Liu et al. | 370/330 |
| 2011/0096796 A1* | 4/2011 | Zhang et al. | 370/474 |
| 2012/0051246 A1* | 3/2012 | Zhang et al. | 370/252 |
| 2012/0087426 A1* | 4/2012 | Zhang et al. | 375/260 |
| 2012/0275376 A1* | 11/2012 | Sampath et al. | 370/328 |
| 2013/0010632 A1* | 1/2013 | Wang et al. | 370/252 |

FOREIGN PATENT DOCUMENTS

| | | |
|---|---|---|
| CN | 101258730 A | 9/2008 |
| CN | 101361308 A | 2/2009 |
| JP | 2009-177462 A | 8/2009 |
| JP | 2009-543471 A | 12/2009 |
| JP | 2010-506515 A | 2/2010 |
| JP | 2010-93704 A | 4/2010 |
| WO | WO 2006062356 A1 * | 6/2006 |
| WO | 2006/078494 A2 | 7/2006 |
| WO | 2007/064710 A2 | 6/2007 |
| WO | WO 2008/002972 A2 | 1/2008 |
| WO | WO 2008/045845 A1 | 4/2008 |
| WO | WO 2008/155370 A2 | 9/2008 |

OTHER PUBLICATIONS

Xia et al., "Open-Loop Link Adaptation for Next-Generation IEEE 802.11n Wireless Networks," IEEE Transactions on Vehicular Technology, vol. 58, No. 7, Sep. 2009, pp. 3713-3719.

* cited by examiner

METHOD FOR REPORTING CHANNEL INFORMATION BASED ON LINK ADAPTATION IN WIRELESS LOCAL AREA NETWORK AND THE APPARATUS FOR THE SAME

CROSS REFERENCE TO RELATED APPLICATIONS

This application is the National Phase of PCT/KR2011/008993 filed on Nov. 23, 2011, which claims priority under 35 U.S.C. 119(e) to U.S. Provisional Application No. 61/417,284 filed on Nov. 26, 2010, all of which are hereby expressly incorporated by reference into the present application.

TECHNICAL FIELD

The present invention relates to wireless communication and, more particularly, to a channel information reporting method based on a link adaptation method performed between stations (STAs) in a Wireless Local Area Network (WLAN) system and an apparatus for supporting the same.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

The next-generation WLAN system supports the transmission of a Multi-User Multiple Input Multiple Output (MU-MIMO) scheme in which a plurality of non-AP STAs accesses a radio channel at the same time in order to efficiently use the radio channel. According to the MU-MIMO transmission scheme, an AP can transmit a frame to one or more MIMO-paired STAs at the same time.

The AP and the plurality of MU-MIMO paired STAs may have different capabilities. In this case, a supportable bandwidth, modulation coding scheme (MCS), forward error correction (FEC), etc., may vary depending on an STA type, usage, channel environment, etc.

According to the MU-MIMO transmission scheme, a transmitter can transmit data to each of a plurality of MU-MIMO paired receivers through at least one or more spatial streams. Herein, a channel between the transmitter and a first receiver and a channel between the transmitter and a second receiver may generate mutual interference. As such, the inter-channel interference between the transmitter and the receiver may obstruct correct data transmission and reception, which may result in decrease in overall throughput of the WLAN system. Accordingly, when data is transmitted by using the MU-MIMO transmission scheme to improve throughput of the WLAN system supporting the MU-MIMO transmission scheme, there is a need to feed back a modulation and coding scheme (MCS) in sequence by considering interference between different channels.

Meanwhile, an environment for transmission and reception between an AP and an STA may be changed. For example, the AP may want to control the number of spatial streams to be transmitted to the STA and send the spatial streams to the STA. Furthermore, the STA may determine that the transmission and reception of data will be optimized by using what spatial streams from among all the spatial streams available between the AP and the STA without being limited to spatial streams allocated by the AP. In this WLAN environment, there is a need for a link adaptation method in which the STA may feed back recommended spatial streams, determined by the STA, and a recommended a Modulation Coding Scheme (MCS) to be applied to the relevant spatial streams to the AP.

SUMMARY OF INVENTION

Technical Problem

The present invention provides a method for reporting channel information based on a link adaptation in a wireless local area network, which supports Multiple User-Multiple Input Multiple Output (MU-MIMO) transmission.

Solution to Problem

In an aspect, a method for reporting channel information in a wireless local area network system is provided. The method includes receiving a data block for requesting a modulation and coding scheme (MCS) feedback from a requesting station, the data block including a data field and a stream indicator indicating a number of at least one spatial stream in the data field; determining, the MCS feedback based on the data block; and, transmitting the MCS feedback to the requesting station, the MCS feedback including a recommended MCS and a recommended stream indicator indicating a number of at least one recommended spatial stream. The number of the at least one recommended spatial stream in the MCS feedback is equal or less than the number of the at least one spatial stream in the data block.

If the number of the at least one recommended spatial stream in the MCS feedback is less than the number of the at least spatial stream in the data block, the recommended MCS may be estimated under an assumption that the at least one recommended spatial stream is at least one first spatial stream among the at least one spatial stream in the data block.

The MCS feedback may be determined based on a bandwidth used for transmitting the data field and a coding scheme applied to the data field.

The data block further may include a channel bandwidth indicator indicating the bandwidth; and, a coding scheme indicator indicating the coding scheme.

The data block may further comprise a MRQ indicator requesting the MCS feedback.

The MRQ indicator may be implemented 1 bit field.

The data block may be a physical layer convergence procedure (PLCP) protocol data unit (PPDU).

The data field may comprise a physical service data unit (PSDU) and the MRQ indicator may be included in the PSDU.

In another aspect, an wireless apparatus is provided. The apparatus includes a transceiver transmitting and receiving radio signal; and, a processor operationally coupled to the transceiver. The processor is configured for the step of: receiving a data block for requesting a modulation and coding scheme (MCS) feedback from a requesting station, the data block including a data field and a stream indicator indicating a number of at least one spatial stream in the data field; determining the MCS feedback based on the data block; and, transmitting the MCS feedback to the requesting station, the MCS feedback including a recommended MCS and a recommended stream indicator indicating a number of at least one recommended spatial stream. The number of the at least one recommended spatial stream in the MCS feedback is equal or less than the number of the at least one spatial stream in the data block.

Advantageous Effects of Invention

An STA determines what spatial streams have been optimized for a current WLAN environment regarding spatial streams being used by an AP. Next, the STA feeds back information, indicating spatial streams to be used for MU-MIMO transmission between the AP and the STA, and information, indicating an optimized MCS to be applied to the relevant spatial streams, to the AP. That is, MFB information fed back by the STA includes spatial stream indication information and recommended MCS information. In a WLAN environment in which the use or an occupation situation of spatial streams may be changed, an AP may receive MCS feedback (MFB) information from an STA and perform MU-MIMO transmission by using spatial streams fed back thereto and a recommended MCS. At the time of the MU-MIMO transmission, the AP may utilize spatial streams more efficiently as compared with the existing method and apply an optimal MCS estimated and computed by the STA. Accordingly, the overall throughput of a WLAN can be improved.

MODE FOR THE INVENTION

Figure 1:
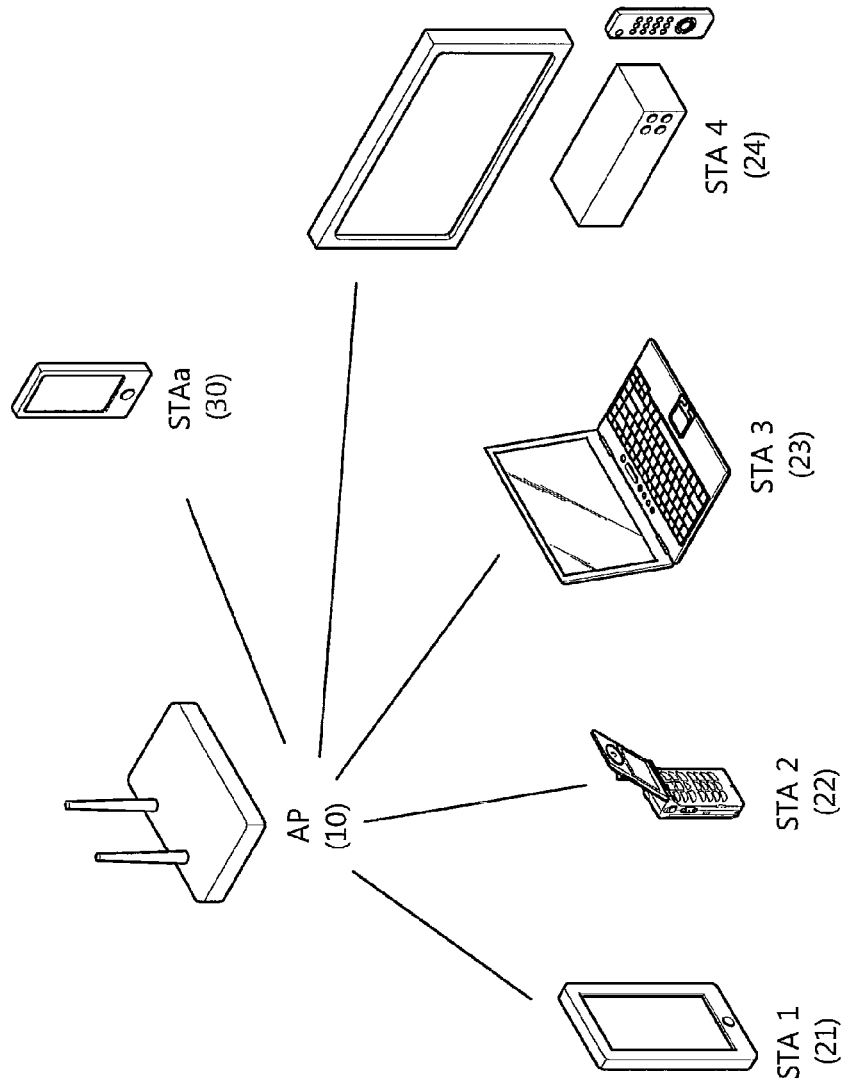
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area.

An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be inter-connected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

Figure 2:
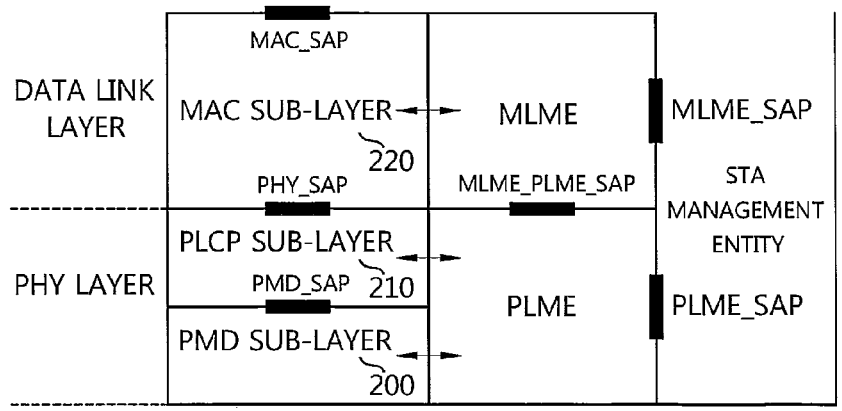
FIG. 2 is a diagram showing the PHY architecture of a WLAN system which is supported by IEEE 802.11.

FIG. 2 is a diagram showing the PHY architecture of a WLAN system which is supported by IEEE 802.11.

The PHY architecture of IEEE 802.11 includes a PHY Layer Management Entity (PLME), a Physical Layer Convergence Procedure (PLCP) sublayer 210, and a Physical Medium Dependent (PMD) sublayer 200. The PLME provides the management function of a physical layer in association with a MAC Layer Management Entity (MLME). The PLCP sublayer 210 transfers a MAC Protocol Data Unit (MPDU), received from a MAC sublayer 220, to the PMD sublayer 200 or transfers a frame, received from the PMD sublayer 200, to the MAC sublayer 220 according to an instruction of a MAC layer between the MAC sublayer 220 and the PMD sublayer 200. The PMD sublayer 200, as a PLCP sublayer, enables the transmission and reception of a physical entity between two STAs through a radio medium. The MPDU transmitted by the MAC sublayer 220 is referred to as a Physical Service Data Unit (PSDU) in the PLCP sublayer 210. The MPDU is similar to the PSDU, but if an Aggregated MPDU (A-MPDU) in which a plurality of MPDUs is aggregated is transferred, each MPDU and each PSDU may be different from each other.

In a process of transferring the PSDU, received from the MAC sublayer 220, to the PMD sublayer 200, the PLCP sublayer 210 adds a supplementary subfield, including information necessary for a physical transceiver, to the PSDU. The field added to the PSDU may include tail bits necessary to restore a PLCP preamble, a PLCP header, and a convolution encoder to a zero state. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sublayer 220. The PLCP sublayer 210 uses the information included in the TXVECTOR parameter in order to generate the PPDU including the PSDU.

The PLCP preamble functions to enable a receiver to be prepared for a synchronization function and an antenna diversity before the PSDU is transmitted. A data field may include padding bits, a service field including a bit sequence for resetting a scrambler, and a coded sequence in which the bit sequence having tail bits added thereto has been encoded in the PSDU. Here, an encoding scheme may be either a Binary Convolutional Coding (BCC) encoding scheme or a Low Density Parity Check (LDPC) encoding scheme according to an encoding scheme supported by an STA that receives a PPDU. The PLCP header includes a field including information about a PLCP Protocol Data Unit (PPDU) to be transmitted. The PLCP header will be described in more detail later with reference to FIG. 3.

The PLCP sublayer 210 generates the PPDU by adding the field to the PSDU and transmits the generated PPDU to a receiving STA via the PMD sublayer 200. The receiving STA receives the PPDU, obtains information necessary to restore data from a PLCP preamble and a PLCP header, and restores the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

A WLAN system supports transmit channels of a more contiguous 160 MHz band and a discontiguous 80+80 MHz band in order to support a higher throughput. Furthermore, the WLAN system supports a Multiple User-Multiple Input Multiple Output (MU-MIMO) transmission scheme. In a WLAN system supporting the MU-MIMO transmission scheme, an AP or an STA or both that try to transmit data may transmit data packets to one or more MU-MIMO-paired receiving STAs at the same time.

Referring back to FIG. 1, in a WLAN system, such as that shown in FIG. 1, the AP 10 may transmit data to an STA group including at least one STA, from among the plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

The data respectively transmitted to each of the STAs may be transmitted through different spatial streams. The data packet transmitted by the AP 10 may be a PPDU, generated and transmitted by the physical layer of a WLAN system, or a data field included in the PPDU, and the data packet may be referred to as a frame. That is, a data field included in a PPDU for SU-MIMO or MU-MIMO or both may be called an MIMO packet. In an example of the present invention, it is assumed that a target transmission STA group MU-MIMO-paired with the AP 10 includes the STA 1 21, the STA 2 22, the STA 3 23, and the STA 4 24. Here, data may not be transmitted to a specific STA of the target transmission STA group because spatial streams are not allocated to the specific STA. Meanwhile, it is assumed that the STAa 30 is associated with the AP 10, but not included in the target transmission STA group.

In order to support MU-MIMO transmission in a WLAN system, an identifier may be allocated to a target transmission STA group, and the identifier may be called a group ID. An AP transmits a group ID management frame, including group definition information, to STAs supporting MU-MIMO transmission in order to allocate a group ID to the STAs. The group ID is allocated to the STAs based on the group ID management frame prior to PPDU transmission. A plurality of group IDs may be allocated to one STA.

Table 1 below shows information elements included in the group ID management frame.

TABLE 1

| Order | Information |
| --- | --- |
| 1 | Category |
| 2 | VHT action |
| 3 | Membership status |
| 4 | Spatial stream position |

The frames of the category field and the VHT action field correspond to management frames. The category field and the VHT action field are set to identify that the relevant frames are group ID management frames used in the next-generation WLAN system supporting MU-MIMO.

As in Table 1, group definition information includes the membership status information, indicating whether an STA belongs to a specific group ID, and spatial stream position information indicating that what place is the spatial stream set of a relevant STA located from all the spatial streams according to MU-MIMO transmission if the STA belongs to the relevant group ID.

Since a plurality of group IDs is managed by one AP, membership status information provided to one STA needs to indicate whether the STA belongs to each of the group IDs managed by the AP. Accordingly, the membership status information may exist in an array form of subfields, indicating whether the STA belongs to each group ID. The spatial stream position information may exist in an array form of subfields, indicating a position of a spatial stream set occupied by an STA regarding each group ID, because the spatial stream position information indicates a position for each group ID. Furthermore, the membership status information and the spatial stream position information for one group ID may be implemented within one subfield.

If an AP transmits a PPDU to a plurality of STAs according to the MU-MIMO transmission scheme, the AP includes information, indicating a group ID, in the PPDU, and transmits the information as control information. When an STA receives the PPDU, the STA checks whether it is a member STA of a target transmission STA group by checking a group ID field. If the STA is checked to be a member of the target transmission STA group, the STA may check that what place is a spatial stream set, transmitted thereto, placed from all the spatial streams. Since the PPDU includes information about the number of spatial streams allocated to a reception STA, the STA can receive data by searching for spatial streams allocated thereto.

Figure 3:
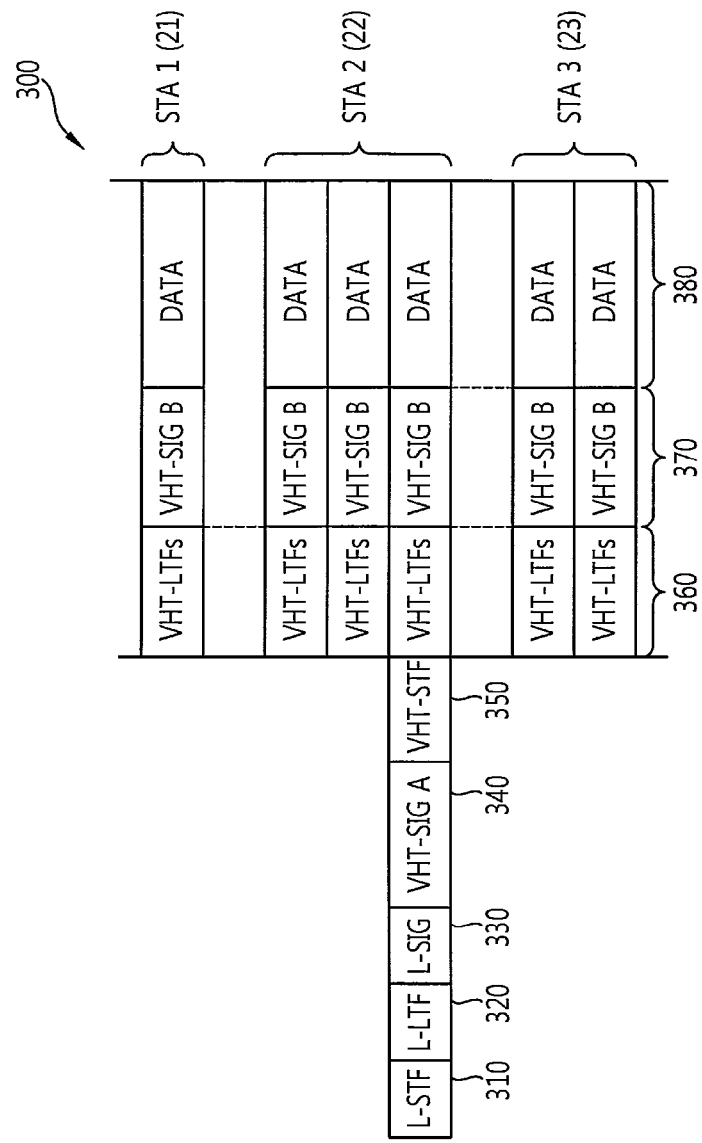
FIG. 3 is a diagram showing an example of a PPDU format used in a WLAN system.

FIG. 3 is a diagram showing an example of a PPDU format used in a WLAN system.

Referring to FIG. 3, a PPDU 300 may include an L-STF 310, an L-LTF 320, an L-SIG field 330, a VHT-SIG A field 340, a VHT-STF 350, a VHT-LTF 360, a VHT-SIG B field 370, and a data field 380.

The PLCP sublayer forming the physical layer converts a PSDU, received from the MAC layer, into the data field 380 by adding necessary information to the PSDU, generates the PPDU 300 by adding fields, such as the L-STF 310, the L-LTF 320, the L-SIG field 330, the VHT-SIG A field 340, the VHT-STF 350, the VHT-LTF 360, and the VHT-SIGB field 370, to the data field 380, and transmits the PPDU 300 to one or more STAs through the PMD sublayer forming the physical layer. Control information necessary for the PLCP sublayer to generate the PPDU and control information, included in the PPDU and transmitted so that a receiving STA can use the control information to interpret the PPDU, are provided from the TXVECTOR parameter received from the MAC layer.

The L-STF 310 is used for frame timing acquisition, Automatic Gain Control (AGC) convergence, coarse frequency acquisition, etc.

The L-LTF 320 is used for channel estimation for demodulating the L-SIG field 330 and the VHT-SIG A field 340.

The L-SIG field 330 is used for an L-STA to receive the PPDU 300 and obtain data by interpreting the PPDU 300. The L-SIG field 330 includes a rate subfield, a length subfield, parity bits, and a tail field. The rate subfield is set to a value indicating a bit rate for data to be transmitted now.

The length subfield is set to a value indicating the octet length of a Physical Service Data Unit (PSDU) that the MAC layer requests a physical layer to send the PSDU. Here, an L_LENGTH parameter related to information about the octet length of the PSDU is determined on the basis of a TXTIME parameter related to transmission time. TXTIME indicates a transmission time determined by the physical layer in order to transmit a PPDU including the PSDU, in response to a transmission time that the MAC layer has requested the physical layer to send the PSDU. Since the L_LENGTH parameter is a parameter related to time, the length subfield included in the L-SIG field 330 includes information related to the transmission time.

The VHT-SIG A field 340 includes control information (or signal information) necessary for STAs, receiving the PPDU 300, to interpret the PPDU 300. The VHT-SIG A field 340 is transmitted through two OFDM symbols. Accordingly, the VHT-SIG A field 340 may be divided into a VHT-SIG A1 field and a VHT-SIG A2 field. The VHT-SIG A1 field includes channel bandwidth information used for PPDU transmission, information indicating whether Space Time Block Coding (STBC) is used, information indicating a scheme for transmitting a PPDU, from among SU and MU-MIMO schemes, information indicating a target transmission STA group including a plurality of STAs that are MU-MIMO-paired with an AP if the transmission scheme is the MU-MIMO scheme, and information about spatial streams allocated to each STA of the target transmission STA group. The VHT-SIG A2 field includes short Guard Interval (GI)-related information.

The information indicating the MIMO transmission scheme and the information indicating the target transmission STA group may be implemented into a piece of MIMO indication information. For example, they may be implemented in the form of a group ID. The group ID may be set to a value having a specific range. A specific value of the range may indicate the SU-MIMO transmission scheme, and the remaining values of the range may be used as an identifier for a relevant target transmission STA group if the PPDU 300 is transmitted according to the MU-MIMO transmission scheme.

If the group ID indicates that the PPDU 300 is transmitted according to the SU-MEMO transmission scheme, the VHT-SIG A2 field includes coding indication information, indicating whether a coding scheme applied to a data field is a Binary Convolution Coding (BCC) scheme or a Low Density Parity Check (LDPC) coding scheme, and Modulation Coding Scheme (MCS) information about a channel between a sender and a recipient. Furthermore, the VHT-SIG A2 field may include the AID of an STA to which the PPDU 300 will be transmitted or a partial AID including some bit sequences of the AID or both.

If the group ID indicates that the PPDU 300 is transmitted according to the MU-MEMO transmission scheme, the VHT-SIG A field 340 includes coding indication information indicating whether a coding scheme applied to a data field to be transmitted to reception STAs that are MU-MIMO-paired is the BCC scheme or the LDPC coding scheme. In this case, Modulation Coding Scheme (MCS) information for each reception STA may be included in the VHT-SIG B field 370.

The VHT-STF 350 is used to improve AGC estimation performance in MIMO transmission.

The VHT-LTF 360 is used for an STA to estimate a MIMO channel. The VHT-LTF 360 may be set to the number corresponding to the number of spatial streams through which the PPDU 300 is transmitted because the next-generation WLAN system supports MU-MIMO. Additionally, full channel sounding is supported. If the full channel sounding is performed, the number of VHT-LTFs may be further increased.

The VHT-SIG B field 370 includes dedicated control information which is necessary for a plurality of MIMO-paired STAs to obtain data by receiving the PPDU 300. Accordingly, only when common control information included in the VHT-SIG B field 370 indicates that the received PPDU 300 has been subjected to MU-MIMO transmission, an STA may be designed to decode the VHT-SIG B field 370. On the other hand, if the common control information indicates that the received PPDU 300 is for a single STA (including SU-MIMO), an STA may be implemented not to decode the VHT-SIG B field 370.

The VHT-SIG B field 370 includes information about an MCS and information about rate matching for each STA. The VHT-SIG B field 370 further includes information indicating the length of a PSDU which is included in a data field for each STA. The information indicating the length of the PSDU is information indicating the length of the bit sequence of the PSDU and may be indicated by an octet unit. The size of the VHT-SIG B field 370 may vary an MIMO transmission type (MU-MIMO or SU-MIMO) and a channel bandwidth used for PPDU transmission.

The data field 380 includes data intended to be transmitted to an STA. The data field 380 includes a service field for resetting a PLCP Service Data Unit (PSDU) to which an MAC Protocol Data Unit (MPDU) in the MAC layer has been transferred and a scrambler, a tail field including a bit sequence necessary to restore a convolution encoder to a zero state, and padding bits for normalizing the length of a data field.

In a WLAN system, such as that shown in FIG. 1, if the AP 10 intends to transmit data to the STA 1 21, the STA 2 22, and the STA 3 23, the AP 10 may transmit the PPDU to an STA group including the STA 1 21, the STA 2 22, the STA 3 23, and the STA 4 24. In this case, the data may be transmitted in such a manner that spatial streams are not allocated to the STA 4 24 and a specific number of spatial streams are allocated to each of the STA 1 21, the STA 2 22, and the STA 3 23, as in FIG. 2. In the example of FIG. 2, it can be seen that one spatial stream has been allocated to the STA 1 21, three spatial streams have been allocated to the STA 2 22, and two spatial streams have been allocated to the STA 3 23.

In a WLAN system, in order to efficiently use a given channel, the MU-MIMO transmission scheme must be able to be used by scheduling several STAs at the same time. MU-MIMO transmission means that data can be transmitted to a plurality of STAs at the same time. In this case, an overall throughput of a system can be improved. Here, if each STA feeds back optimal MCS information, including spatial streams information, to an AP in a time-sequential manner, system performance may be further improved.

In data transmission and reception processes in a WLAN system, current open-loop link adaptation using an acknowledgement (ACK) frame, a non-acknowledgement (NACK) frame, etc. is disadvantageous in that channel information between an AP and an STA is not sufficiently utilized. In order to improve the throughput of a WLAN system by supplementing the disadvantage, a method of supporting closed-loop link adaptation for feeding back more accurate channel information to an AP may be taken into consideration.

In a WLAN system, for channel sounding, a Null Data Packet Announcement (NDPA) frame—a Null Data Packet (NDP) transmission method is supported. According to the NDPA frame—NDP transmission method, a plurality of MU-MIMO-paired STAs may estimate channels on the basis of the NDP. Furthermore, the STAs may estimate channels on the basis of the LTF of a common PPDU, including data, as well as the NDP frame. A link adaptation method based on the NDPA frame—NDP transmission method and a link adaptation method based on a common PPDU may be proposed by applying the estimation to link adaptation method.

In below description of a plurality of link adaptation methods according to the embodiments of the present invention, it is assumed that an AP transmitting by using MU-MIMO scheme is a MCS feedback (MFB) requester and STAs MIMO paired with the AP are MFB responders. However, the present invention is not limited thereto, and thus the MFB requester and the MFB responder may be the AP and/or the STAs.

Figure 4:
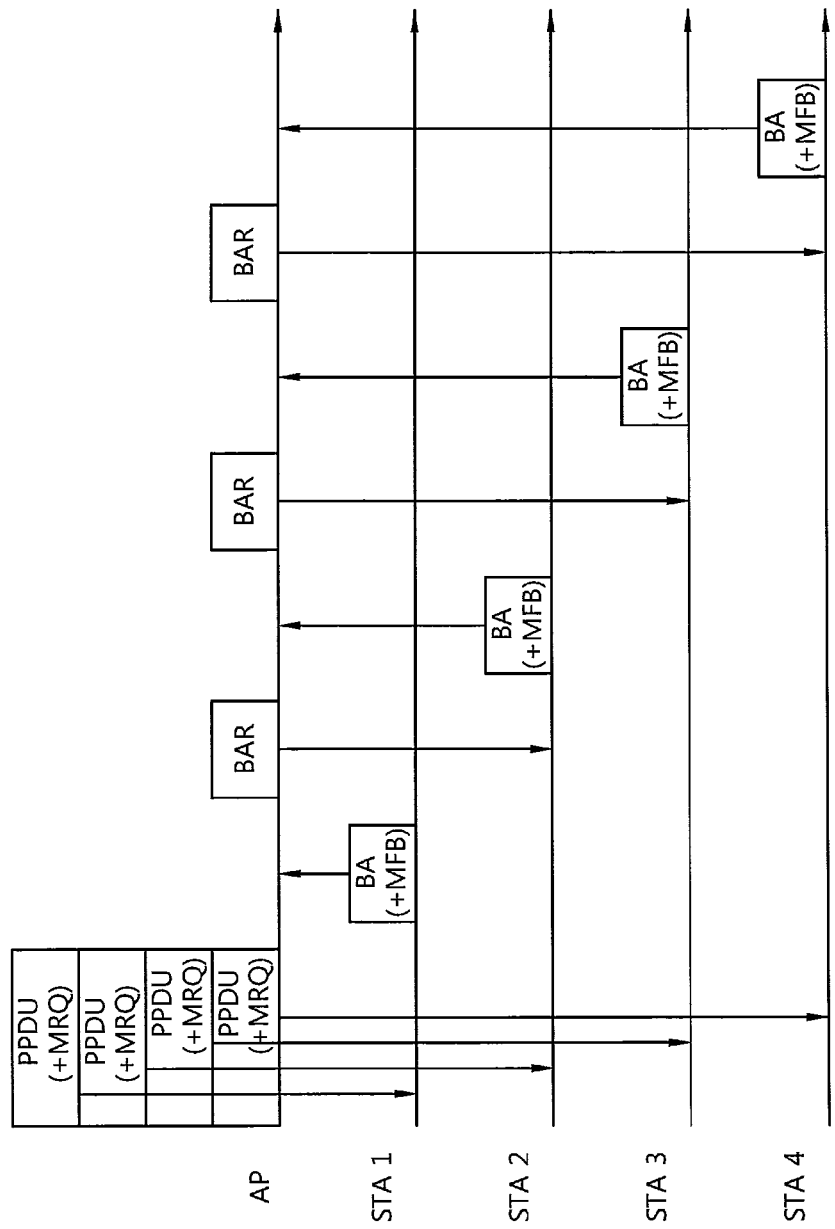
FIG. 4 is a diagram showing an example of a link adaptation method.

FIG. 4 is a diagram showing an example of a link adaptation method.

There is proposed the link adaptation method based on a PPDU including data. An AP may obtain a beamforming matrix suitable for transmission to each STA by using information obtained through a previous channel sounding procedure. Accordingly, the AP may send the PPDU of a precoded form in which an MCS Request (MRQ) has been set to each of MU-MIMO-paired STAs.

For link adaptation, each STA must estimate a channel. The estimation may be performed on the basis of a VHT-LTF which is the PLCP preamble of the transmitted PPDU. Since data units are aggregated and transmitted in data transmission employing a PPDU, the STA may check the reception of the received PPDU by using a Block Ack (BA) frame. The STA may include MCS Feedback (MFB) information in the BA frame and transmit the BA frame.

In order to request an MCS from each STA, an AP may set the MCS request (MRQ) subfield of an MCS request or Antenna Selection (ASEL) Indication (MAI) field, included in the MAC header of a PSDU transmitted to the STA, to 1. In this case, since a Null Data Packet (NDP) is not used, an NDP announcement subfield is set to 0. This setting may be implemented by using the HT control field of the MAC header which forms the PSDU transmitted to each STA. Furthermore, the setting of the HT control field may be implemented by setting the HT control field included in a control wrapper frame. In other words, the setting of the HT control field may be implemented by including the control frame in the control wrapper frame and setting the HT control field within the control wrapper frame because the HT control field may not be included in a common control frame supported by a WLAN system.

Each STA may include MFB information, related to the result of channel estimation, in the HT control field of the control wrapper frame including the BA frame and transmit the HT control field to the AP.

Figure 5:
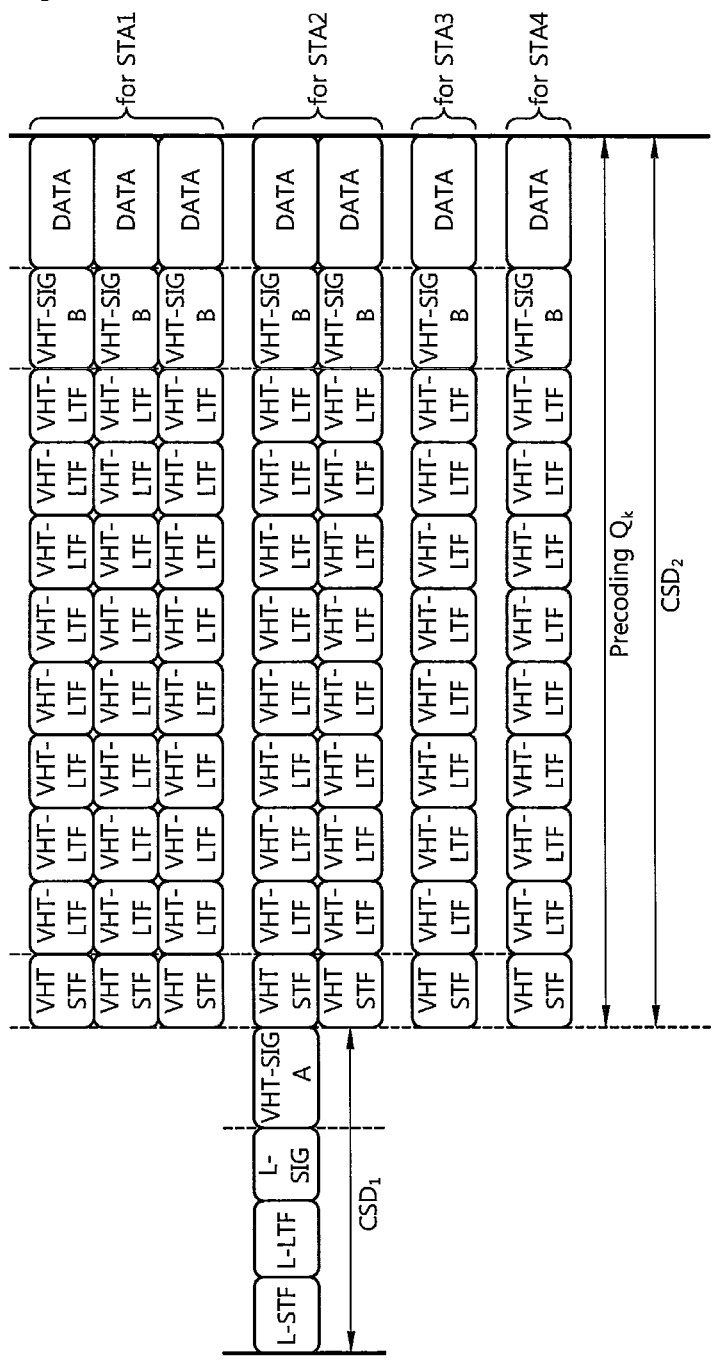
FIG. 5 is a diagram showing another example of a PPDU format used in a WLAN system.

In the example shown in FIG. 4, if an AP transmits a PPDU having a format, such as that shown in FIG. 5, to STAs, the group ID of a VHT-SIG A field includes information about that the AP is participating in data transmission with what STAs. It is assumed that an STA1, an STA2, an STA3, and an STA4 are included in a target STA group and three spatial streams, two spatial streams, one spatial stream, and one spatial stream have been allocated to the STA1, the STA2, the STA3, and the STA4, respectively.

Although a total of 7 spatial streams have been used, 8 LTFs are required in order for a receiver to perform channel estimation. In legacy preambles L-STF and L-LTF and a VHT-SIG A field for a legacy STA, one spatial stream is transmitted through all transmission antennas. Fields subsequent to a VHT-STF field are subject to Cyclic Shift Delay (CSD) and precoding according to a precoding matrix and are then transmitted.

Each of the STAs that have received the PPDU obtains the data through each decoding process and transmits a BA frame to the AP. Each STA includes estimation MCS information, assuming that the data is received through spatial streams allocated to the relevant STA using channel information estimated based on the LTF, in the BA frame and sends the BA frame to the AP. When the MCS is estimated, the relevant STA may estimate and compute the MCS by taking interference that may be caused by spatial streams not allocated to the relevant STA into consideration.

According to the setting of a group ID, The STA1 includes an MCS Feedback (MFB) in the BA frame and sends the BA frame to the AP. When the AP sends a Block ACK Request (BAR) to a specific STA in response thereto, the specific STA may include MFB information in a BA frame and send the BA frame to the AP.

Additionally, whenever the BAR is successively transmitted to each STASTA, a corresponding STA may send MFB information simultaneously with a BA frame. Likewise, in the process of estimating and computing the MCS, the corresponding STA may estimate and compute the MCS by using spatial streams allocated thereto, assuming that the remaining spatial streams may function as interference.

Figure 6:
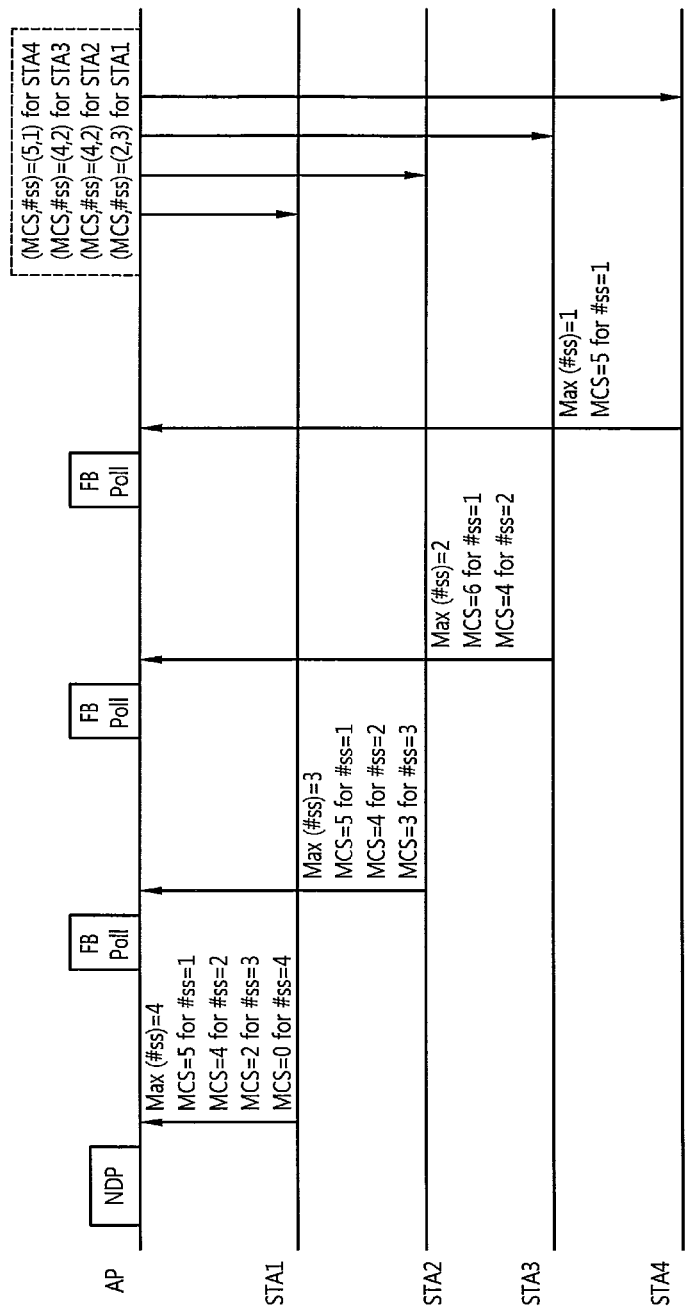
FIG. 6 is a diagram showing another example of a link adaptation method.

FIG. 6 is a diagram showing another example of a link adaptation method.

Referring to FIG. 6, an AP sends an NDP to each of STAs. The NDP is a frame that is used by each STA for channel estimation. The NDP has a format of a PPDU not including a data field. As in the reception of the PPDU, when the NDP is received, each of the STAs may perform channel estimation on the basis of an LTF included in the NDP. Before sending the NDP, the AP sends an NDPA framei., one of control frames, in order to inform that the NDP will be transmitted.

Figure 7:
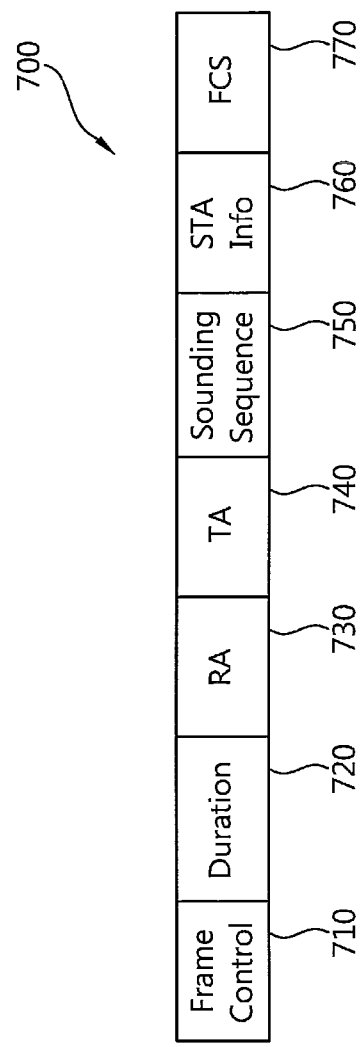
FIG. 7 is a block diagram showing a format of the NDPA frame.

FIG. 7 is a block diagram showing a format of the NDPA frame.

Referring to FIG. 7, the NDPA frame 700 includes a frame control field 710, a duration field 720, a Receiver Address (RA) field 730, a Transmitter Address (TA) field 740, a sounding sequence field 750, at least one STA information field 760, and a Frame Check Sequence (FCS) field 770. The frame control field 710 includes control information related to the NDPA frame 700. The duration field 720 indicates the length of the NDPA frame 700. The RA field 730 indicates an address of an STA that receives the NDPA frame 700 and may indicate a broadcast address. The TA field 740 indicates an address of an AP or an STA or both which transmit the NDPA frame 700. The sounding sequence field 750 includes the number of sounding sequences to be now included. The STA information field 760 includes information to identify a target channel sounding STA and information about feedback information according to channel sounding. If one or more target channel sounding STAs exist, one or more STA information fields 760 may be included in the NDPA frame 700.

Referring back to FIG. 6, the NDPA frame is a control frame used for a channel sounding procedure according to the NDPA frame—NDP transmission method. Accordingly, since the NDPA frame itself does not include an HT control field, information to request MCS estimation cannot be included in the NDPA frame. However, since an STA can acquires information for the MCS estimation based on the NDPA frame and performs channel estimation using the NDP, a link adaptation method based on the NDPA frame and the NDP is also possible. To this end, there is proposed a method of including the NDPA frame in a control wrapper frame and transmitting the control wrapper frame so that an MRQ can be triggered by sending the NDPA frame. The MRQ setting may be implemented by setting the HT control field included in the control wrapper frame.

An MRQ and NDP announcement are set in the HT control field of the control wrapper frame including the NDPA frame. Furthermore, information about the NDP transmitted to each STA must be included in the HT control field. The group ID of the VHT-SIG A field of a PPDU includes information about a target MU-MIMO transmission STA group by the AP. Each STA may obtain indication information about the number of spatial stream from a unicasted and/or broadcasted PPDU.

The setting of the MRQ and the NDP announcement may be implemented by setting the link adaptation subfield and the NDP announcement subfield of the HT control field.

Meanwhile, the NDP itself includes a VHT-SIG A field including information about a group ID and the allocation of spatial streams. However, the group ID of the NDP is agreed to indicate that transmission scheme is the SU transmission scheme. Accordingly, information that may be obtained from the VHT-SIG A field of the NDP is information about the allocation of spatial streams and the MCS.

Meanwhile, as described above, the MCS-related information applied to each spatial stream may be differently implemented according to a value set in a group ID. Accordingly, in case of an NDP, the MCS-related information should be set as in MU transmission irrespective of the group ID. In this case, an STA may obtain the MCS-related information by interpreting a VHT-SIG B field.

An STA may know that it is engaged with transmission with an AP based on the unicasted or broadcasted PPDU. If information about the number of spatial streams of the PPDU is equal to information about the number of spatial streams of the NDP, the STA may obtain information about the number of spatial streams allocated thereto. Furthermore, the STA may obtain MCS information, applied to each of the spatial streams, from the VHT-SIG B field of the NDP. Each STA may estimate and compute an optimal MCS by taking spatial streams, allocated to other STAs, into consideration on the basis of the MCS information and send MFB information to an AP according to the polling scheme of the AP. Each STA sends a feedback frame including an HT control field, including the obtained spatial streams information and the MCS information. The link adaptation method according to the above description is based on the NDPA frame—NDP transmission method. Accordingly, the feedback frame may be a VHT beamforming compressed frame, and the feedback frame may further include Channel State Information (CSI) according to channel sounding.

The AP receives the CSI and all pieces of possible MFB information from the STAs through the link adaptation procedure. Each STA indicates that the MFB information is an MCS that has been optimally estimated for each of spatial streams. When the MFB information is received from each STA, the AP may select a proper MCS by taking an optimal system throughput upon next transmission or fairness for every STA into consideration so that spatial streams are fairly allocated to the highest degree.

In the example of FIG. 6, it is assumed that the number of spatial streams that may be transmitted by the AP is 8 and the number of spatial streams available for the AP is 4, 3, 2, and 1. The AP may do not accept all the requests of the STAs. In this case, it is assumed that the MU transmission scheme rather than the SU transmission scheme is determined to be advantageous in terms of a system throughput and spatial streams need to be fairly allocated to each STA.

Meanwhile, when the STAs feed back MCSs after estimating the MCSs, each STA may feed back the MCS on the basis of the SU-MIMO transmission scheme and, at the same time, may feed back the MCS assuming that a transmission scheme is an MU-MIMO transmission scheme. Here, the assumption of the MU-MIMO transmission scheme and the feedback of the MCS may be performed assuming that the number of spatial streams and a transmission power have other restrictions, unlike in the SU-MIMO transmission scheme.

Figure 8:
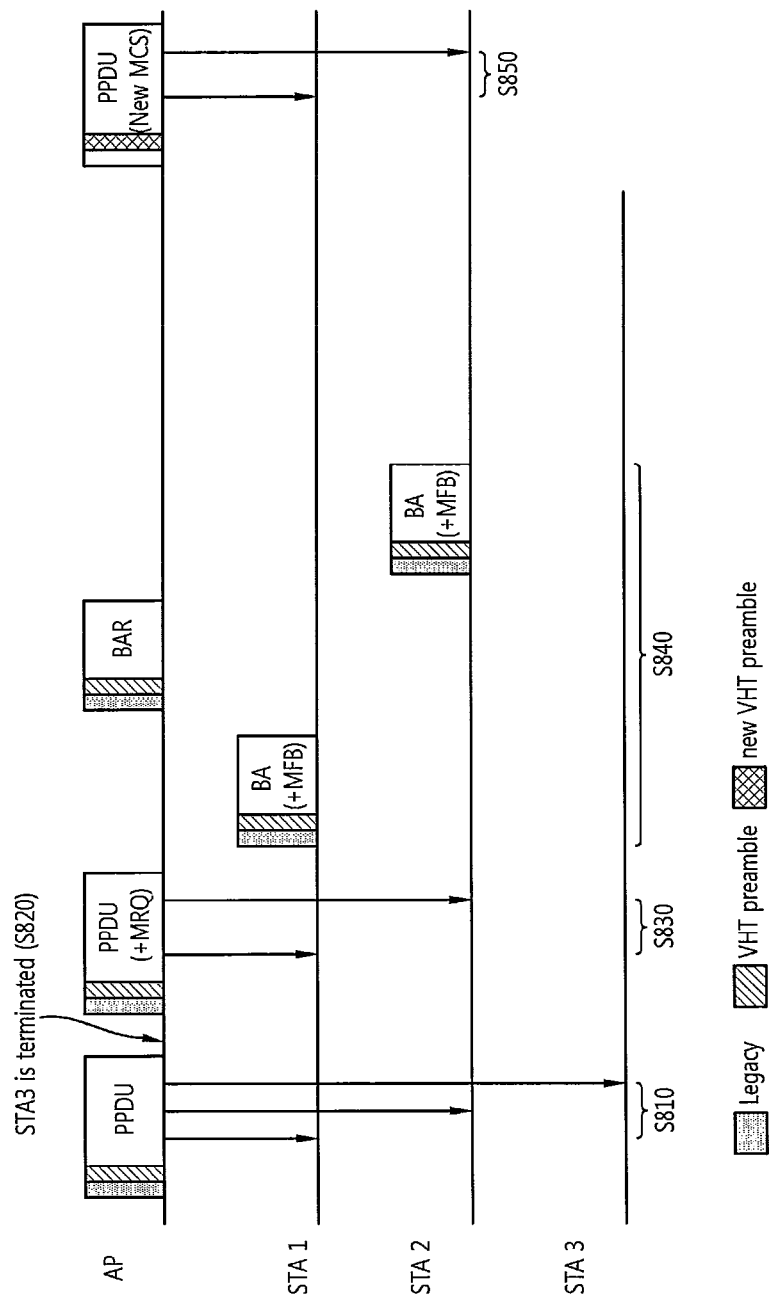
FIG. 8 is a diagram showing still another example of a link adaptation method.

FIG. 8 is a diagram showing still another example of a link adaptation method. In this example, it is assumed that the number of STAs that are MU-MIMO-paired with an AP is 3 and there is no change of a channel.

Referring to FIG. 8, an AP transmits a PPDU to an STA 1, an STA 2, and an STA 3 according to the MU-MIMO transmission scheme at step S810. The PPDU may be transmitted on the basis of the result that previous channel sounding has been performed.

Next, there is no data to be transmitted from the AP to the STA 3 or the connection of the AP with the STA 3 may be terminated at step S820.

The AP may allocate additional radio resources, generated as a result of the termination of the connection with the STA 3, to the existing STA 1 and STA 2. In this case, a new channel sounding procedure is not necessary in calculating a new precoding matrix for reallocating the resources because there is no change in a channel.

The AP initiates a link adaptation procedure for the STA 1 and the STA 2. The AP transmits a PPDU, including an HT control field in which an MRQ has been set, to the STA 1, the STA 2, and the STA 3 at step S830.

Each of the STA 1, the STA 2, and the STA 3 estimates a channel and an MCS on the basis of the VHT-LTF of the PPDU and feeds back MFB information to the AP at step S840. The MFB information feedback, by the STAs MU-MIMO paired with the AP, is performed based on a polling mechanism, transmitting and/or receiving a BA frame and/or BA request (BAR) frame.

The AP performs data transmission on the basis of a new MCS obtained in the process at step S850.

In order to improve the throughput of the next-generation WLAN system, a more efficient link adaptation method needs to be proposed. When there is a change in the number of spatial streams to be transmitted by an AP, a spatial stream indication scheme may be proposed. Furthermore, when an STA determines to use the number of spatial streams smaller than the number of spatial streams received from an AP from a viewpoint of the throughput, a link adaptation method of feeding back MFB information to the AP is proposed.

In a WLAN system, a maximum of 4 spatial streams may be allocated to each STA and transmitted according to a downlink MU-MIMO transmission scheme. If the number of spatial streams to be transmitted from an AP to an STA is reduced, the AP may request MCS estimation for a situation from the STA without performing a new channel sounding procedure. The AP may initiate the link adaptation procedure by transmitting a PPDU including MRQ. The STA may also inform the AP that it will be efficient to use one or more spatial streams, corresponding to specific streams of all special streams, by using information about the number of spatial streams to be changed, received from the AP.

The number of spatial streams is not changed when a specific STA does not use all the spatial streams, but at least one recommended spatial stream may be indicated even when a Signal to Interference plus Noise Ratio (SINR) is changed in each spatial stream.

Figure 9:
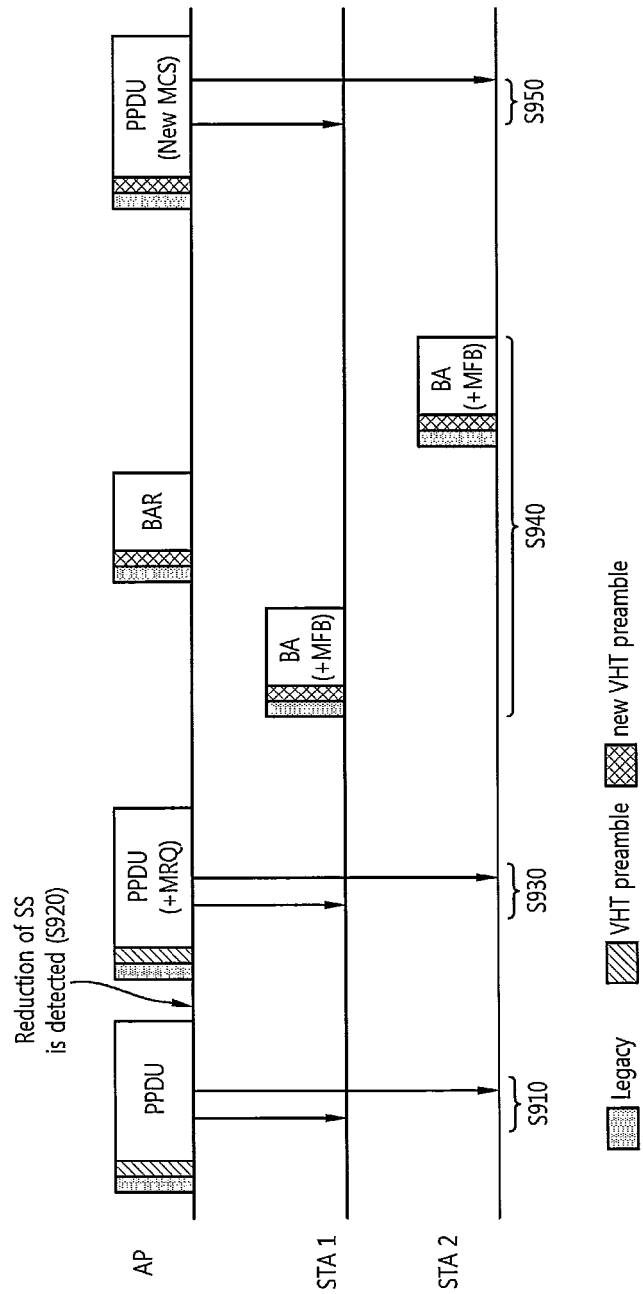
FIG. 9 is a diagram showing a link adaptation method according to an embodiment of the present invention.

FIG. 9 is a diagram showing a link adaptation method according to an embodiment of the present invention.

An AP transmits a PPDU to an STA 1 and an STA 2 by using the MU-MIMO transmission scheme at step S910.

If the AP detects that the number of spatial streams transmitted to each STA will be reduced at step S920, the AP may inform each STA of the number of spatial streams to be reduced. It is provided that AP transmits a PPDU including MRQ for a method for informing each STA of the number of spatial streams to be reduced (S930).

This method may be implemented by setting spatial stream indication information of the VHT-SIG A1 field in the PPDU including data.

Each STA may determine MCS information, estimated based on the PPDU or NDP or both, and what spatial streams will be used and may feed MFB information back to the AP at step S940. MFB information feedback is performed based on polling by BAR frame transmitted from AP. When the MFB information including spatial stream indication information and MCS indication information is fed back from each of the STAs, the AP transmits a PPDU on the basis of the MFB information at step S950.

Here, each STA may feed the relevant information back to the AP by setting the link adaptation subfield of a control wrapper frame including a BA frame. The link adaptation subfield is included in an HT control field. The setting of the link adaptation subfield is described below.

Figure 10:
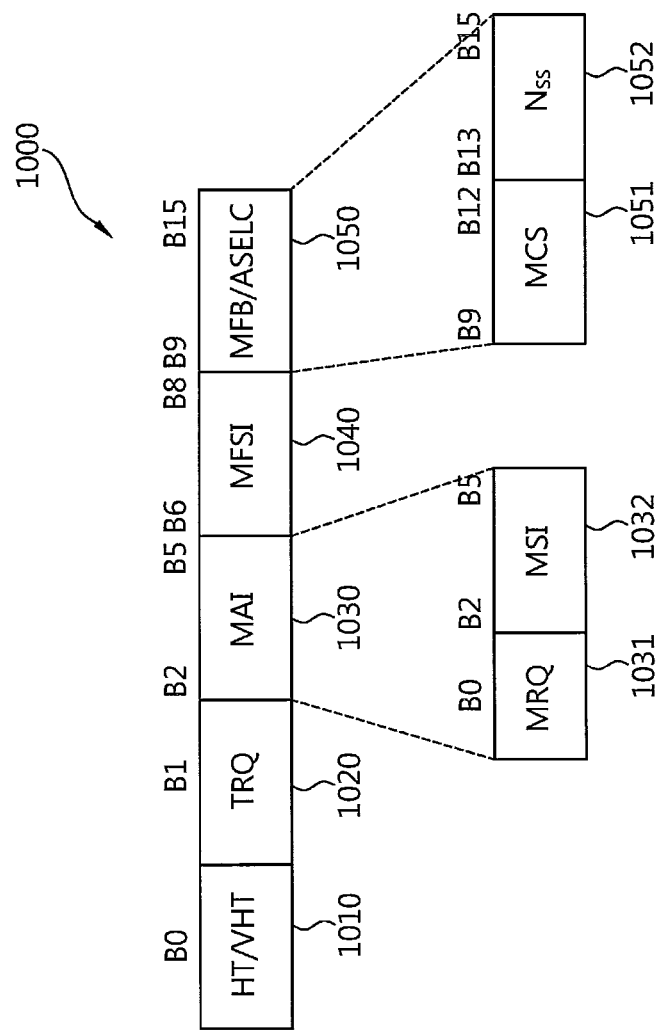
FIG. 10 is a block diagram showing an example of the existing link adaptation subfield format.

FIG. 10 is a block diagram showing an example of the existing link adaptation subfield format.

Referring to FIG. 10, a link adaptation subfield 1000 includes an HT/VHT subfield 1010, a training request (TRQ) subfield 1020, an MCS request or antenna selection (ASEL) Indication (MAI) subfield 1030, an MCS Feedback sequence identifier (MFSI) subfield 1040, and an MCS feedback and Antenna1 Selection command/data (MFB/ASELC) subfield 1050.

The HT/VHT subfield 1010 indicates whether the link adaptation subfield 1000 or an HT control field including the link adaptation subfield 1000 or both are for HT transmission supporting SU-MIMO or VHT transmission supporting SU/MU-MIMO.

The TRQ subfield 1020 indicates a request to send a training sequence for initiating a channel sounding procedure.

The MAI subfield 1030 includes an MRQ subfield 1031 and an MRQ sequence identifier (MSI) subfield 1032. The MRQ subfield 1031 indicates whether to initiate a link adaptation procedure. That is, the MRQ subfield 1031 indicates whether MCS estimation has been requested. The MSI subfield 1032 includes information to a sequence for identifying the request, when MCS estimation has been requested, identifying the specific request.

The MFSI subfield 1040 may be set to a value of the MSI value included in a frame triggering MFB information.

The MFB/ASELC subfield 1050 includes an MCS subfield 1051 and a-Number-of-Spatial-Streams ($N_{ss}$) subfield 1052. The MCS subfield 1051 indicates an MCS recommended by an STA. The $N_{ss}$ subfield 1052 indicates the number of spatial streams which is recommended by an STA.

A total of four bits may be necessary for an STA to inform an AP what spatial streams will be preferably used because a maximum of 4 spatial streams may be allocated to one STA. To this end, there is proposed a method of utilizing the TRQ subfield 1020 and the $N_{ss}$ subfield 1052. In a WLAN system supporting VHT transmission, a channel sounding procedure is performed on the basis of the NDPA frame—NDP transmission method. Thus, 1 bit for the TRQ subfield 1020 may be used for other purposes. Furthermore, a scheme in which an STA directly signalizes what spatial streams will be used, instead of informing an AP of the number of recommended spatial streams, is proposed below. For this scheme, 3 bits of the existing $N_{ss}$ subfield 1052 may be used.

Figure 11:
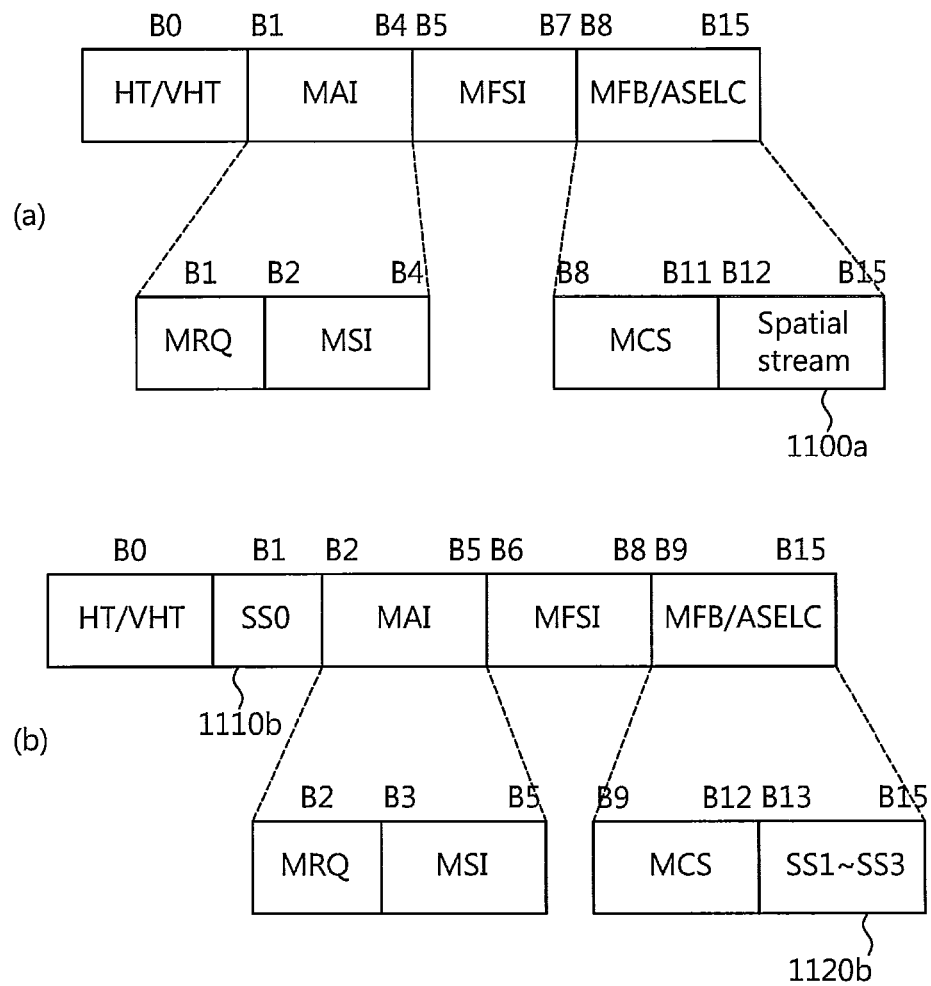
FIG. 11 is a diagram showing an example of a link adaptation subfield according to an embodiment of the present invention.

FIG. 11 is a diagram showing an example of a link adaptation subfield according to an embodiment of the present invention.

Referring to FIG. 11, a link adaptation subfield 1100 includes an HT/VHT subfield 1110, an MAI subfield 1130, an MFSI subfield 1140, and an MFB/ASELC subfield 1150. Referring to FIG. 11(*a*) and FIG. 11(*b*), the link adaptation subfield includes spatial stream subfields 1100*a*, 1110*b*, and 1120*b* of four bits in size, instead of the $N_{ss}$ subfield 1052 of the existing format. The spatial stream subfield may be implemented in a bitmap type that may inform whether to use each of spatial streams in the form of a bit value. Unlike in FIG. 11(*a*), in FIG. 11(*b*), the TRQ subfield and the $N_{ss}$ subfield of the existing format shown in FIG. 11(*a*) are used as the spatial stream subfields. 1 bit that implements the TRQ subfield in FIG. 11(*a*) may be set to indicate whether a first spatial stream SS0 is used (1110*b*), and 3 bits that implements the $N_{ss}$ subfield in FIG. 11(*a*) may be set to indicate whether second to fourth spatial streams SS1 to SS3 are used (1120*b*).

For example, the AP may inform the STA 1 and the STA 2 that three reduced spatial streams and two reduced spatial streams may be transmitted to the STA 1 and the STA 2, respectively, while transmitting four spatial streams to each of the STA 1 and the STA 2. Each of the STAs may first use a spatial stream having a high Signal to Noise Ratio (SNR) or SINR value by using SNR or SINR information about each spatial stream, obtained from the result of the current transmission, in next transmission. Assuming that first, second, and fourth spatial streams have high SNR ratios according to the estimation result of the STA 1, the STA 1 may feed values (1, 1, 0, 1) of spatial stream subfields back to the AP. Furthermore, each STA may estimate an MCS on the basis of a relevant spatial stream and feed MCS information back to the AP.

The above method may also be applied to SU-MIMO transmission. An AP may transmit data to an STA by using eight spatial streams. In this case, the size of a spatial stream subfield may be 8 bits. For a format of a link adaptation subfield according to this method, reference may be made to FIG. 12.

Figure 12:
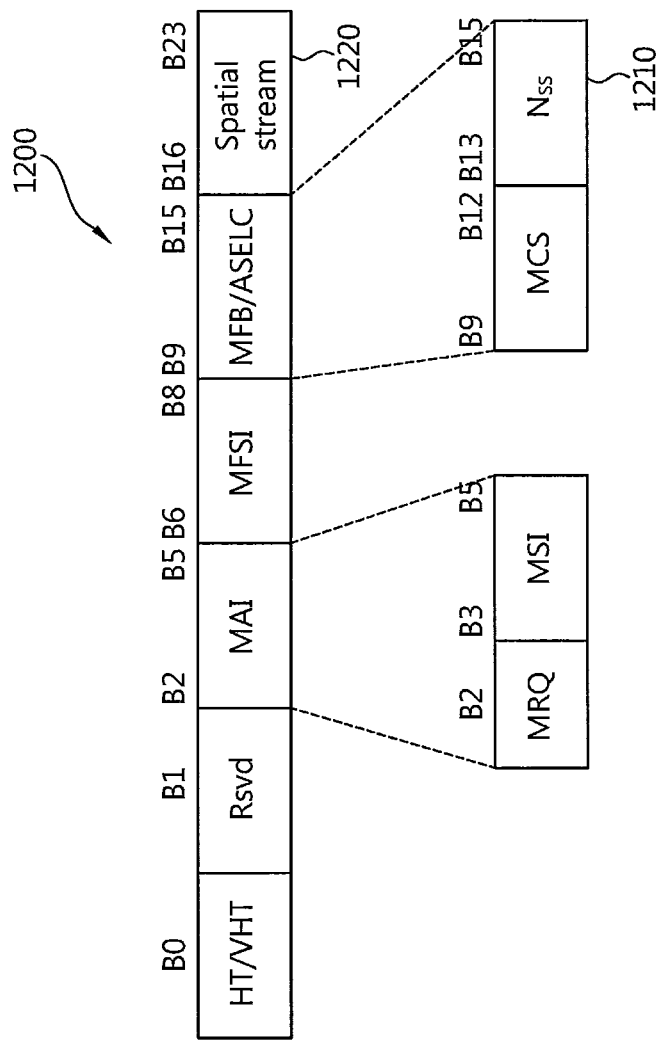
FIG. 12 is a block diagram showing an example of a link adaptation subfield according to an embodiment of the present invention.

Referring to FIG. 12, a link adaptation subfield 1200 includes an $N_{ss}$ subfield 1210 and a spatial stream subfield 1220. The N. subfield 1210 indicates the number of recommended spatial streams, and the spatial stream subfield 1220 includes information of a bitmap type indicating what spatial streams will be used.

Meanwhile, in a normal link adaptation procedure, STAs perform optimal MCS estimation by taking interference resulting from other STAs into consideration on the basis of the number of spatial streams transmitted by an AP. A series of processes, however, may not result in an optimal result from a viewpoint of a system throughput. It would be better to transmit the number of spatial streams smaller than the number of spatial streams designated by an AP by using a high MCS from a viewpoint of an instantaneous system throughput. A system environment, such as that shown in FIG. 13, is described below as an example.

Figure 13:
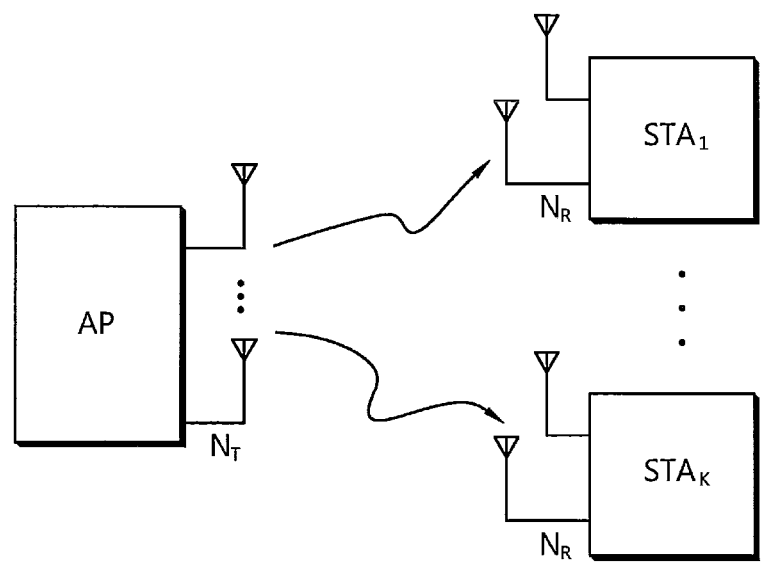
FIG. 13 is a diagram showing an example of a WLAN system to which the embodiments of the present invention may be applied.

FIG. 13 is a diagram showing an example of a WLAN system to which the embodiments of the present invention may be applied. An AP performs MU-MIMO transmission to K MU-MIMO-paired STAs. It is assumed that the AP includes $N_T$ transmission antennas and all the STAs include $N_R$ reception antennas.

A signal $r_k$ received from a $k^{th}$ STA is represented by Equation 1 below.

$$r_k = H_k P_k s_k + H_k \sum_{\substack{i=1 \\ i \neq k}}^{K} P_i s_i + n_k \qquad \text{[Equation 1]}$$

In Equation 1, $P_k$ is the precoding matrix of the AP, $s_k$ is a data stream to be transmitted to the $k^{th}$ STA, and L is the number of data streams. $H_k$ indicates a channel between the AP and the $k^{th}$ STA. The precoding matrix $P_k$, the data stream $s_k$, and the channel matrix $H_k$ may be represented by Equation 2 below.

$$P_k \in C^{N_T \times L}, s_k \in C^{L \times 1}, H_k \in C^{N_R \times N_T} \qquad \text{[Equation 2]}$$

If each STA uses a reception matrix $$W_k \in C^{L \times N_T}$$

, a post-processing received signal $$\hat{s}_k$$

may be represented by Equation 3 below.

$$\hat{s}_k = W_k r_k = W_k H_k P_k s_k + W_k \left( H_k \sum_{\substack{i=1 \\ i \neq k}}^{K} P_i s_i + n_k \right) \qquad \text{[Equation 3]}$$

When a linear MMSE filter is used a receiving filter, the SINR of an $l^{th}$ stream of the $k^{th}$ STA may be represented by Equation 4 below.

$$\text{SINR}_{k,l} = p_{k,l}^H H_k^H R_{k,l}^{-1} H_k p_{k,l}$$

$$R_{k,l} = H_k P_k P_k^H H_k^H + R_{n_k} - H_k p_{k,l} p_{k,l}^H H_k^H \qquad \text{[Equation 4]}$$

In Equation 4, $p_{k,l}$ refers to an $l^{th}$ column of the precoding matrix $P_k$.

Instantaneous mutual information of a system may be represented by Equation 5 below.

$$I = \sum_{k=1}^{K} \sum_{l=1}^{L_k} \log(1 + SINR_{k,l})$$ [Equation 5]

Instantaneous mutual information of the $k^{th}$ STA may be represented by Equation 6 below.

$$I_k(L) = \sum_{l=1}^{L} \log(1 + SINR_{k,l}) = \log \prod_{l=1}^{L} (1 + SINR_{k,l})$$ [Equation 6]

Assuming that the transmission power of the AP is constant based on the equation, if power is differently allocated to spatial streams, it would be better for the $k^{th}$ STA to use the number of spatial streams smaller than a maximum number of available spatial streams from a better instantaneous throughput on the $k^{th}$ STA. That is, $I_k(L') < I_k(L)$ may occur regarding $L' < L$. In this situation, a method of estimating and computing an MCS when data is transmitted using reduced spatial streams is described below.

It is assumed that a code rate for an MCS index n is R(n) (where n=0, 1, ..., 8). It is also assumed that an MCS index calculated on the basis of spatial streams transmitted from an STA to an AP is n and an MCS index estimated on the basis of the reduced spatial streams is n'. In this case, there is proposed an MCS index computation method, such as Equation 7.

$$n' = \underset{m}{\mathrm{argmax}} \{ m \mid I_k(L') \cdot R(m) \le I_k(L) \cdot R(n) \}$$ [Equation 7]

In general, an AP may find it difficult to detect a change of the channel between an STA and the AP. Since the AP requests MCS estimation through a PPDU that is subject to MU-MIMO transmission, MFB information is determined on the basis of the PPDU. Here, if an STA may be able to detect a change, such as the number of optimized spatial streams that has not been detected by an AP, a method of indicating such detection through MFB information is proposed.

Figure 14:
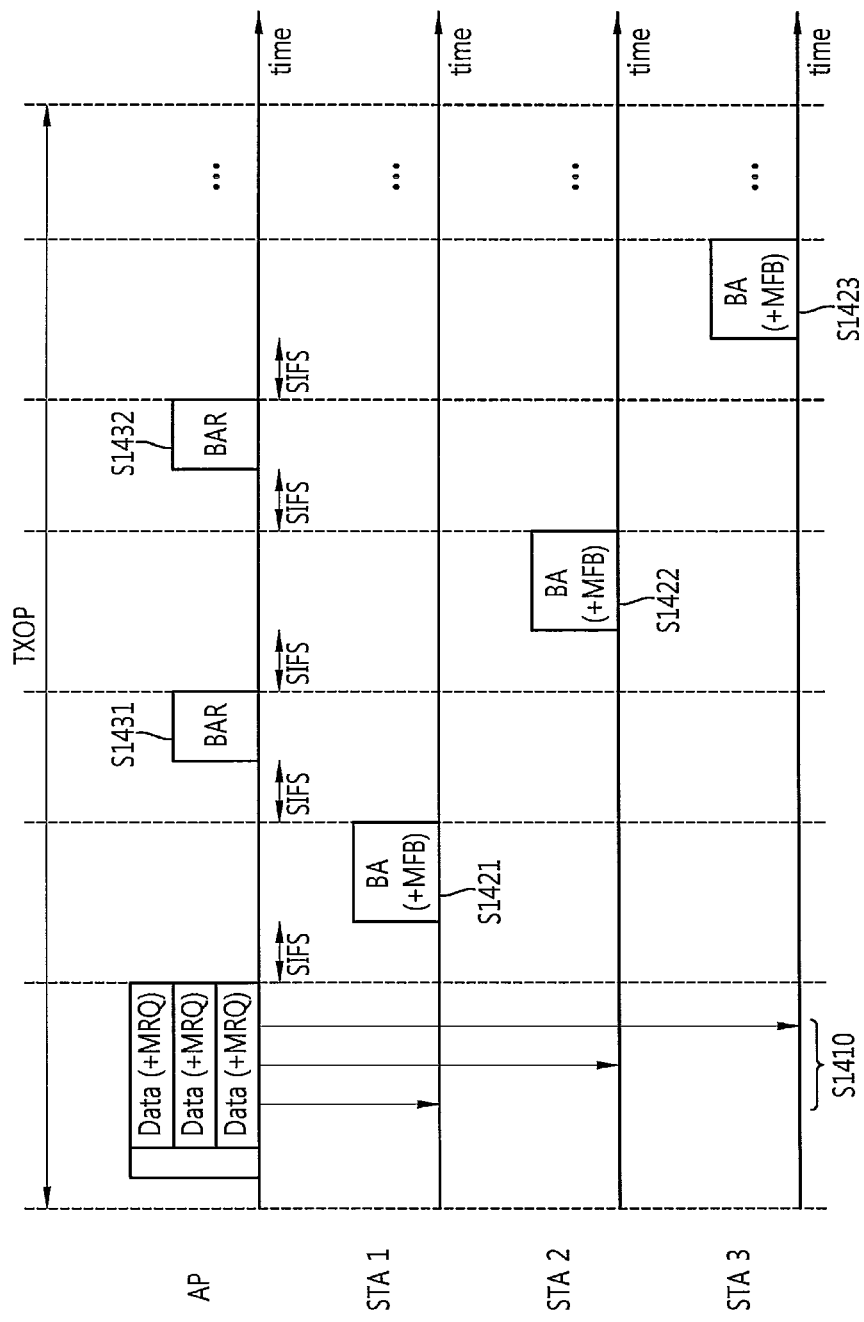
FIGS. 14 and 15 are diagrams showing examples of a link adaptation method according to an embodiment of the present invention.
Figure 15:
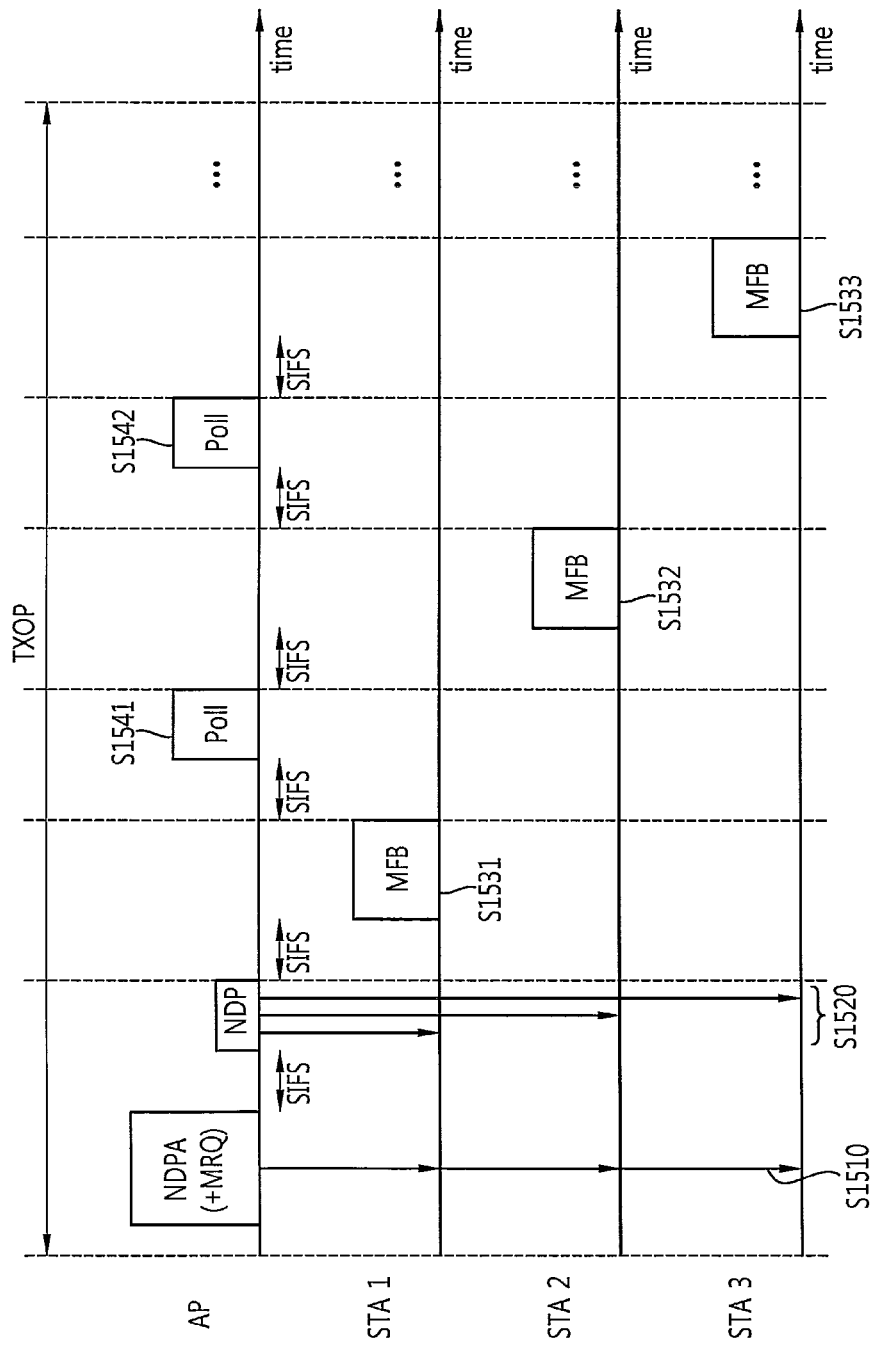

FIGS. 14 and 15 are diagrams showing examples of a link adaptation method according to an embodiment of the present invention.

Referring to FIG. 14, an AP transmits a PPDU in which an MRQ has been set to an STA 1, an STA 2, and an STA 3 at step S1410. The STAs transmits respective BA frames to the AP at steps S1421, S1422, and S1423. The BA frame is transmitted through a control wrapper frame. MFB information is included in the control wrapper frame and then fed back to the AP. An STA that will perform a feedback in the first place is determined on the basis of group ID and spatial stream indication information set by the AP, and subsequent feedback steps are performed when the AP transmits respective BAR frames at step S1431 and S1432.

Referring to FIG. 15, an AP transmits an NDPA frame in which an MRQ has been set to an STA 1, an STA 2, and an STA 3 at step S1510 and then transmits an NDP thereto at step S1520. In response thereto, the STA 1, the STA 2, and the STA 3 feed respective pieces of MFB information back to the AP at steps S1531, S1532, and S1533. The MFB information may be included in a feedback frame transmitted by each STA. The feedback frame may be a VHT compressed beamforming frame transmitted when a channel sounding response is made. The MFB information may be included in an HT control field and then transmitted. An STA that will transmit the feedback frame in the first place is determined on the basis of group ID and spatial stream indication information set by the AP. Subsequent feedback steps are performed when the AP transmits respective poll frames at steps S1541 and S1542.

The MFB information may be estimated and computed on the basis of an RXVECTOR which is a reception information parameter for a PPDU transmitted by an AP and triggers an MRQ. The RXVECTOR may include a channel bandwidth parameter, a group ID parameter, an $N_{ss}$ parameter, a transmit chain number parameter, an applied encoding scheme parameter, a beamforming parameter, and an STBC parameter. The MFB subfield of an HT control field having a VHT format, included in a BA frame or a feedback frame transmitted by an STA, includes an $N_{ss}$ subfield indicating the number of spatial streams that is recommended by the STA. Here, the $N_{ss}$ subfield may be set to a value equal to or smaller than the number of spatial streams which is allocated to the STA and indicated by the $N_{ss}$ parameter of the reception information parameter RXVECTOR.

Assuming that a spatial stream dimension N to be estimated by an STA is given by an AP, if the STA arbitrarily feeds an MCS suitable for spatial stream dimension smaller than the spatial stream dimension N, there may be a problem in that the AP does not know how the MCS will be used. For example, if an AP transmits a PPDU to the STA and makes the STA estimate channel for two spatial streams by using column vectors v1 and v2 of a precoding matrix applied to the PPDU, the STA may determine that it would be advantageous to receive one spatial stream rather than to receive the two spatial streams. The STA may include indicator for the one spatial stream and an MCS suitable for the one spatial stream in MFB information and feed the MFB information back to the AP. In this case, the AP does not know how the one spatial stream will be best optimized. For this, there is proposed a method of indicating detailed spatial stream configuration information when an STA feeds the number of spatial streams smaller than the number of spatial streams, allocated by an AP, back as MFB information.

In a signal for channel estimation requesting an MCS, if the number of spatial streams smaller than a set of given spatial streams is fed back, there is a proposed method of feeding information indicating specific spatial streams to be used and a recommended MCS to be applied to the specific spatial streams. To this end, there is proposed a method of implementing the spatial stream indication information in a bitmap type and feeding back the spatial stream indication information.

For example, assuming that the total number of transmitted spatial streams is 4, an MCS, indicating a higher throughput as a result of comparing a throughput estimated by computing an MCS when the 4 spatial streams are used in an STA with a throughput estimated by computing an MCS when 3 spatial streams are used in the STA, may be fed back. Here, the most optimal spatial stream configuration may be indicated in a bitmap type. An AP does not configure a new precoding column vector, but may continue to use the existing precoding column vector and thus receive a more optimal MCS from an STA. Accordingly, a process of computing a new precoding column vector when an optimal spatial stream is used can be omitted, and an optimal MCS can be used between the AP and the STA.

A detailed method of informing an AP of spatial streams and an MCS recommended by an STA is described below with reference to FIGS. 16 to 18. It is assumed that the total number of spatial streams supported for MIMO transmission in a WLAN system is 8. It is also assumed that each of the 8 spatial streams, allocated to each STA, can be distinguished from each other using index values. What spatial stream group among all spatial streams transmitted from AP is allocated to a specific STA is signaled by a spatial stream position information element of group ID management frame. Therefore, the STA determine at least one spatial stream allocated to itself when AP transmits PPDU to the STA with signaling a number of spatial streams allocated to each of STAs MU-MIMO paired with the AP. If each of spatial streams transmitted from AP can be distinguished from the others among the spatial streams by indices allocated to the spatial streams, the STA may use and manage at least one spatial stream allocated to itself by using the indices.

Figure 16:
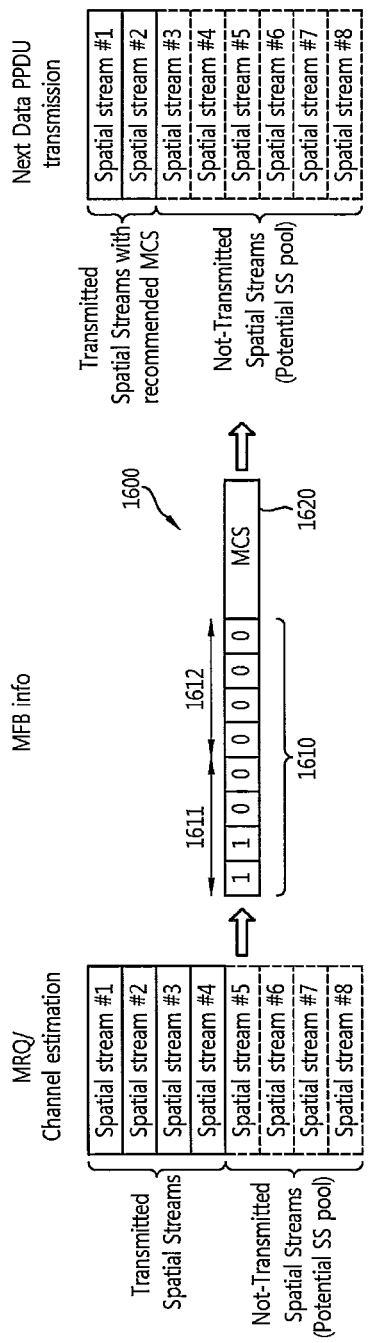
FIGS. 16 to 18 are diagrams showing examples of indicating recommended spatial streams and a recommended MCS according to an embodiment of the present invention.
Figure 17:
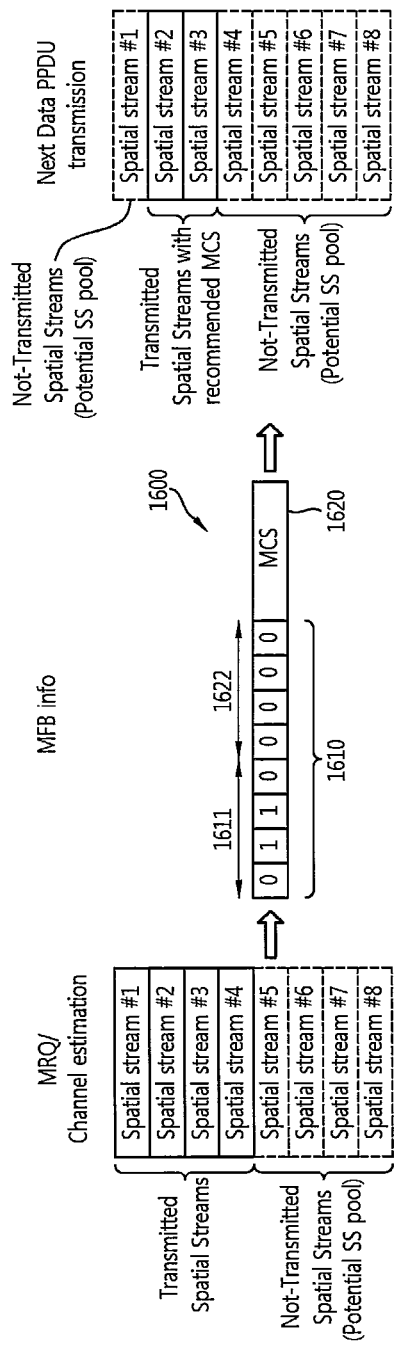

FIGS. 16 and 17 are diagrams showing an example of a spatial stream indication according to an embodiment of the present invention.

An AP transmits a frame, requesting MCS estimation, to an STA by using a spatial stream 1 to a spatial stream 4. The STA configures MFB information 1600, including spatial stream indication information 1610 and recommended MCS indication information 1620. In the spatial stream indication information 1610, whether each of spatial streams is used may be configured in a bitmap type by allocating 1 bit to each of the spatial streams. The spatial stream indication information 1610 may be divided into a part 1611 for spatial streams allocated to the STA and a part 1612 for the remaining spatial streams not allocated to the STA. In the part 1611 for the allocated spatial streams, a bit for a recommended spatial stream may be set to 1, and a bit for a non-recommended spatial stream may be set to 0. The part 1612 not allocated by the AP may be basically set to 0.

If the first bit and the second bit of the bitmap are set to 1 and the remaining bits thereof are set to 0 as in FIG. 16, the AP may determine that the STA has recommended the spatial stream 1 and the spatial stream 2. Furthermore, when transmitting a PPDU to the STA, the AP may use the spatial stream 1 and the spatial stream 2 and use a recommended MCS indicated by the MCS indication information 1620.

If the first bit and the third bit of the bitmap are set to 1 and the remaining bits thereof are set to 0 as in FIG. 17, the AP may determine that the STA has recommended the spatial stream 2 and the spatial stream 3. Furthermore, when transmitting a PPDU to the STA, the AP may use the spatial stream 2 and the spatial stream 3 and use a recommended MCS indicated by the MCS indication information 1620.

When feeding back MFB information, as a bitmap type, the number of spatial streams smaller than the number of spatial streams indicated in a signal transmitted for performing MRQ and channel estimation, an STA must compute an optimal MCS and compare throughputs for all possible combinations. When an MCS is requested using eight spatial streams, an STA must compute an optimal MCS and compare throughputs for 7 or lower all spatial stream combinations. It may result in overload when the STA operates. In order to avoid this problem, there is proposed a method of recommending the number of spatial streams smaller than the number of spatial streams required in an MRQ, but previously agreeing a configuration of the recommended spatial streams between an AP and an STA. An example of the proposed method may be given as shown n FIG. 18.

Figure 18:
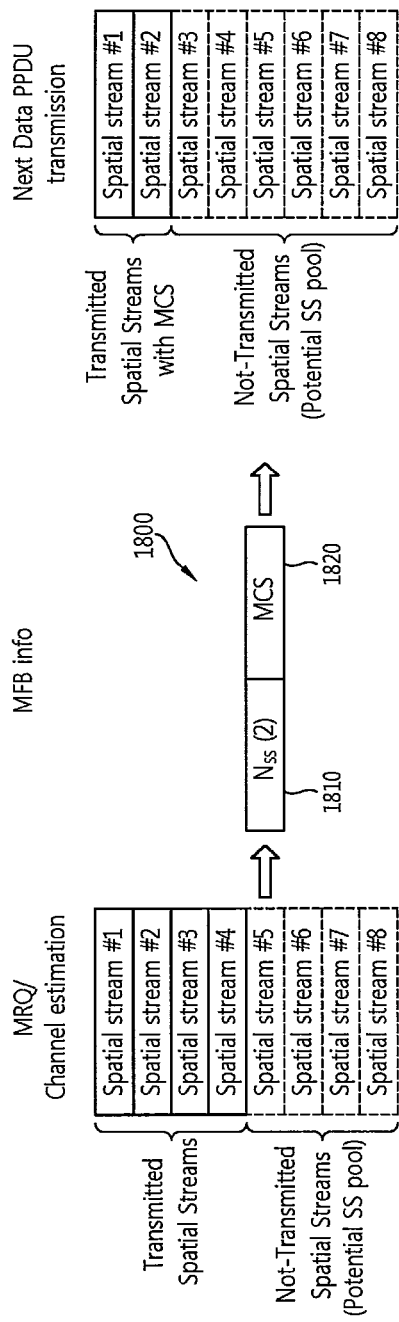

FIG. 18 is a diagram showing an example of spatial stream indication according to an embodiment of the present invention.

MFB information 1800 configured by an STA includes $N_{ss}$ indication information 1810 and recommended MCS indication information 1820. When feeding the MFB information back to an AP, the STA recommends that the AP use the number of spatial streams equal to or smaller than the number of spatial streams, allocated to the STA, through a PPDU in which an MRQ has been triggered. In this case, it is assumed that spatial streams among the allocated spatial streams are contiguously used from a spatial stream having a smaller index value. The MFB information may be estimated and computed assuming that the relevant spatial streams will be used.

In FIG. 18, since a spatial stream1 to a spatial stream 4 have been allocated when the AP triggered the MRQ, The STA estimates and computing the MFB information under an assumption that the spatial stream 1 and the spatial stream 2 are used by AP and/or the STA. If, the PPDU triggering the MRQ allocates the spatial stream 3 to spatial stream 6 to the STA, the STA may estimate and computing the MFB information under an assumption that the spatial stream 3 and the spatial stream 4 are used for transmitting a PPDU by AP and/or the STA.

On receipt MFB information from the STA, the AP may determine to use the spatial stream1 and the spatial stream2 through the recommended number of spatial streams information included in the MFB information, and acquire the MCS recommended by the STA.

Figure 19:
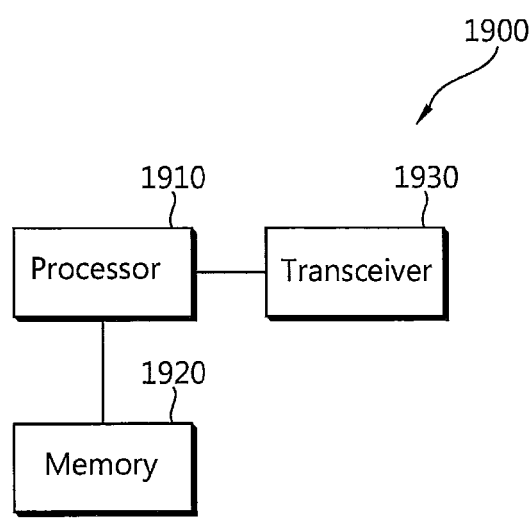
FIG. 19 is a block diagram showing a wireless apparatus according to an embodiment of the present invention.

FIG. 19 is a block diagram showing a wireless apparatus according to an embodiment of the present invention.

Referring to FIG. 19, a wireless apparatus 1900 includes a processor 1910, a memory 1920, and a transceiver 1930. The transceiver 1930 transmits and/or receives a radio signal, and implements an IEEE 802.11 physical (PHY) layer. The processor 1910 functionally coupled to the transceiver 1930 is configured to implement a MAC layer and/or a PHY layer. The processor 1910 may be configured to generate and transmit the PPDU format according to the embodiments of the present invention. The processor 1910 may further be configured to receive PPDU, interpret a plurality of fields in the PPDU, acquiring control information by the interpreting and data by using the control information. The processor 1910 may further be configured to estimate a channel and feed the MFB information back to the AP. The processor 1910 may be configured to transmit a PPDU according to the MFB information, on receipt the MFB information. The processor 1910 is configured for implementing embodiments for the present invention shown in FIG. 9 to FIG. 18.

The processor 1910 and/or the transceiver 1930 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1920 and may be performed by the processor 1910. The memory 1920 may be located inside or outside the processor 1910, and may be coupled to the processor 1910 by using various well-known means.

The invention claimed is:

1. A method for reporting channel information in a wireless local area network system, the method comprising;

receiving, by a responding station, a data block for requesting a modulation and coding scheme (MCS) feedback from a requesting station, the data block including a data field and a stream indicator indicating a number of spatial streams for the responding station;

determining, by the responding station, the MCS feedback based on the data block; and, transmitting, by the responding station, the MCS feedback to the requesting station, the MCS feedback including a recommended MCS field and a recommended number of spatial streams field, wherein the recommended MCS field indicates an index value of a recommended MCS, wherein the recommended number of spatial streams field indicates a number of at least one recommended spatial stream, wherein the number of the at least one recommended spatial stream is equal to or less than the number of spatial streams for the responding station, and wherein if the number of the at least one recommended spatial streams is less than the number of the spatial streams for the responding station, the recommended MCS is estimated under an assumption that the requesting station will transmit the at least one recommended spatial stream which corresponds to at least one first spatial stream among the spatial streams for the responding station.

2. The method of claim 1,
wherein the MCS feedback is determined based on a bandwidth used for transmitting the data field and a coding scheme applied to the data field.

3. The method of claim 2, wherein the data block further comprises:
a channel bandwidth indicator indicating the bandwidth; and,
a coding scheme indicator indicating the coding scheme.

4. The method of claim 3,
wherein the data block further comprises a MCS request (MRQ) indicator requesting the MCS feedback.

5. The method of claim 4,
wherein the MRQ indicator is implemented 1 bit field.

6. The method of claim 5,
wherein the data block is a physical layer convergence procedure (PLCP) protocol data unit (PPDU).

7. The method of claim 6,
wherein the data field comprises a physical service data unit (PSDU), and,
wherein the MRQ indicator is included in the PSDU.

8. A wireless apparatus comprising:
a transceiver transmitting and receiving radio signal; and,
a processor operationally coupled to the transceiver,
wherein the processor is configured to:
receive a data block for requesting a modulation and coding scheme (MCS) feedback from a requesting station, the data block including a data field and a stream indicator indicating a number of spatial streams for the wireless apparatus;
determine the MCS feedback based on the data block; and
transmit the MCS feedback to the requesting station, the MCS feedback including a recommended MCS field and a recommended number of spatial streams field,
wherein the recommended MCS field indicates an index value of a recommended MCS,
wherein the recommended number of spatial streams field indicates a number of at least one recommended spatial stream,
wherein the number of the at least one recommended spatial stream is equal to or less than the number of spatial streams for the wireless apparatus, and
wherein if the number of the at least one recommended spatial stream is equal to or less than the number of spatial streams for the wireless apparatus, the recommended MCS is estimated under an assumption that the requesting station will transmit the at least one recommended spatial stream which corresponds to at least one first spatial stream among the spatial streams for the wireless apparatus.

9. The method of claim 1,
wherein the number of spatial streams for the responding station is zero or more than zero.

* * * * *